US006574038B2

(12) United States Patent
Tanaka et al.

(10) Patent No.: US 6,574,038 B2
(45) Date of Patent: Jun. 3, 2003

(54) OPTICAL TRANSMISSION PATH HAVING SECTIONS WHICH OVERCOMPENSATE FOR DISPERSION OCCURRING IN THE SECTIONS

(75) Inventors: Toshiki Tanaka, Machida (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/115,980

(22) Filed: Apr. 5, 2002

(65) Prior Publication Data

US 2002/0105719 A1 Aug. 8, 2002

Related U.S. Application Data

(63) Continuation of application No. 09/300,595, filed on Apr. 28, 1999, now Pat. No. 6,433,923.

(30) Foreign Application Priority Data

May 8, 1998 (JP) .......................................... 10-126268

(51) Int. Cl.[7] ........................ H04B 10/12; H04B 10/00; H01S 3/00
(52) U.S. Cl. ................. 359/337.5; 359/161; 359/341.1; 359/337

(58) Field of Search .............................. 359/337.5, 161, 359/341.1, 337

(56) References Cited

U.S. PATENT DOCUMENTS

| 5,539,563 A | 7/1996 | Park .......................... 359/161 |
| 5,559,920 A | 9/1996 | Chraplyvy et al. ......... 385/123 |
| 5,946,117 A | 8/1999 | Meli et al. .................. 359/124 |
| 6,021,245 A | 2/2000 | Berger et al. ............... 385/123 |

FOREIGN PATENT DOCUMENTS

| JP | H8-163094 | 6/1996 |
| JP | H9-023187 | 1/1997 |
| JP | H9-162805 | 6/1997 |

*Primary Examiner*—Stephen C. Buczinski
(74) *Attorney, Agent, or Firm*—Staas & Halsey LLP

(57) ABSTRACT

An optical communication system which includes a transmission path through which a light is transmitted to a specific point, such as to a receiver. The transmission path includes a plurality of sections so that the light travels through the sections to the specific point. Each section overcompensates for dispersion produced in the respective section for the light so that an amount of dispersion for the light at the specific point is substantially zero.

14 Claims, 15 Drawing Sheets

OPTICAL TRANSMISSION PATH HAVING SECTIONS WHICH OVERCOMPENSATE FOR DISPERSION OCCURRING IN THE SECTIONS

CROSS-REFERENCE TO RELATED APPLICATION

This application is a continuation of application Ser. No. 09/300,595, filed Apr. 28, 1999, now U.S. Pat. No. 6,433,923.

This application is based on, and claims priority to, Japanese application number Heisei 10-126268, filed on May 8, 1998, in Japan, and which is incorporated herein by reference.

BACKGROUND OF THE INVENTION

1. Field of the Invention

The present invention relates to an optical communication system which compensates for dispersion. More specifically, the present invention relates to an optical communication system having a transmission path with sections which overcompensate for dispersion occurring in the sections, so that the total dispersion at a point downstream of the sections is approximately zero.

2. Description of the Related Art

In ocean transversal long-haul optical communication systems covering distances of several thousands kilometers, signal transmission is conducted using optical regenerating repeaters which convert an optical signal to an electrical signal to perform retiming, reshaping and regenerating.

However, optical amplifiers which can directly amplify light, without converting the light into an electrical signal, are being investigated for use in optical communication systems. The use of such optical amplifiers can greatly reduce the number of parts in a repeater, improve reliability, and drastically reduce cost, as compared to the use of conventional optical regenerating repeaters.

Moreover, wavelength division multiplexing (WDM) is being used in optical communication systems in increase transmission capacity. With WDM, two or more optical signals at different wavelengths are multiplexed together into a WDM signal. The WDM signal is then transmitted through a single optical fiber as a transmission line. WDM can be compared to a conventional optical communication system where only one optical signal is transmitted through the optical fiber.

An optical amplifier, which directly amplifies light without converting the light into an electrical signal, can be used to amplify a WDM signal. In this case, the optical amplifier will simultaneously amplify each optical signal in the WDM signal.

Therefore, an optical communication system which uses WDM in combination with optical amplifiers can provide high capacity, long-haul optical transmission with a relatively simple, economical structure. Unfortunately, an optical signal transmitted through such an optical communication system can experience a large amount of distortion.

SUMMARY OF THE INVENTION

Accordingly, it is an object of the present invention to provide an optical communication which appropriately compensates for dispersion for optical signals transmitted through the system.

Additional objects and advantages of the invention will be set forth in part in the description which follows, and, in part, will be obvious from the description, or may be learned by practice of the invention.

The foregoing objects of the present invention are achieved by providing an optical communication system which includes a transmission path through which a light is transmitted to a specific point, such as to a receiver. The transmission path includes a plurality of sections so that the light travels through the sections to the specific point. Each section overcompensates for dispersion produced in the respective section for the light so that an amount of dispersion for the light at the specific point is substantially zero.

Objects of the present invention are also achieved by providing an optical communication system which includes a transmission path having a plurality of sections so that the light travels through the sections to a specific point. Each section overcompensates for dispersion produced in the respective section for the light to control the amount of dispersion for the light at the specific point.

Objects of the present invention are further achieved by providing an optical communication system which includes a transmission path. Light is transmitted through the transmission path to a specific point. The transmission path includes a plurality of sections so that the light travels through the sections to the specific point. Each section overcompensates for dispersion produced in the respective section for the light to reduce the total amount of dispersion for the light at the specific point.

Objects of the present invention are also achieved by providing a transmission path including a plurality of sections through which light travels to a specific point, wherein the plurality of sections together overcompensate for dispersion produced in the sections for the light. The total amount of overcompensation in the sections taken together is substantially equal to a residual dispersion in the light at the specific point which would occur if the dispersion for the light in each section was approximately zero.

Further, objects of the present invention are achieved by providing an optical communication system including a transmission path through which a light is transmitted to a specific point, where m dispersion compensators are positioned along the transmission path to divide the transmission path into (m+1) blocks. Each dispersion compensator overcompensates for dispersion produced in the preceding block so that the amount of dispersion for the light at the specific point is substantially zero.

In addition, objects of the present invention are achieved by providing an optical communication system which includes a transmission path through which a light is transmitted to a specific point. A dispersion compensator is positioned along the transmission path before the specific point and overcompensates for dispersion provided by the transmission path to the light up to a point along the transmission path before the specific point, so that the amount of dispersion for the light at the specific point is controlled, reduced, or is substantially zero.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
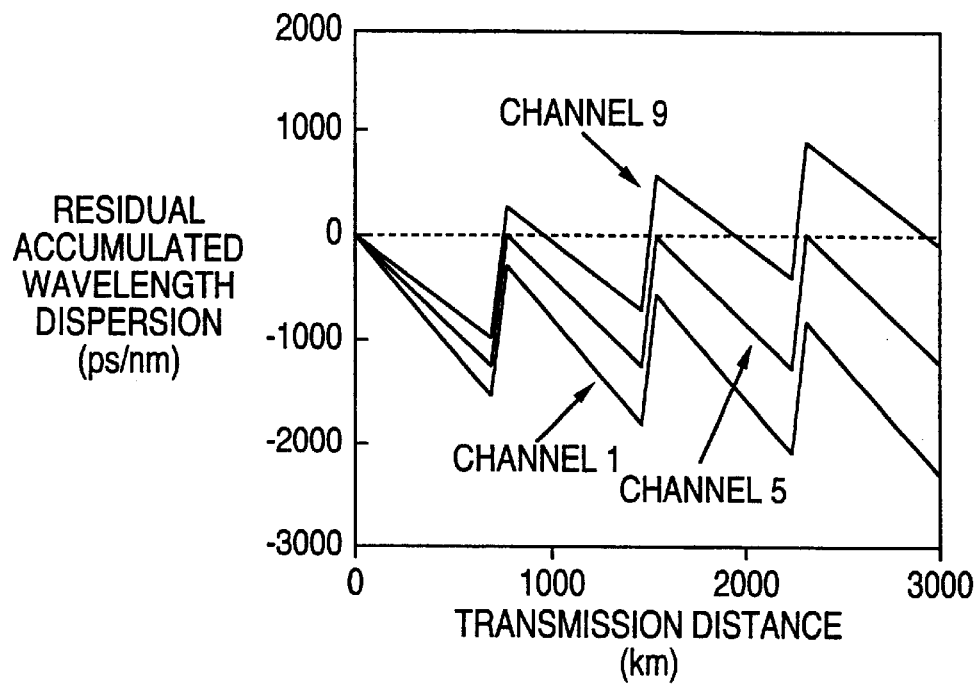
FIG. 1 is a diagram showing a difference in residual accumulated wavelength dispersion amount in different wavelengths by influence of dispersion slope.

Reference will now be made in detail to the present preferred embodiments of the present invention, examples of which are illustrated in the accompanying drawings, wherein like reference numerals refer to like elements throughout.

As indicated above, an optical communication system which uses WDM in combination with optical amplifiers can provide high capacity, long-haul optical transmission with a relatively simple, economical structure.

As an example, a nine-wave multiplex amplifying and repeating optical communication system with a transmission rate of 2.5 Gb/s per wave will be explained. In this example, nine signal waves are set in the range from 1551.0 nm to 1559.0 nm with an interval of 1.0 nm with assignment of channel numbers from the short wavelength side.

For the transmission path, a 1.5 μm zero dispersion fiber and a 1.3 μm zero dispersion fiber are used. The former one is called a dispersion shifted fiber (DSF), and the latter one is called a dispersion compensating fiber (DCF) because it compensates the dispersion accumulated in the DSF. Dispersion of the DSF should be −2 ps/nm/km in average for the wavelength of 1558 nm and that of the DCF should be +18 ps/nm/km. The repeating interval is set to 70 km.

FIG. 1 is a diagram showing difference in the residual accumulated wavelength dispersion amount in each wavelength due to the influence of dispersion slope. FIG. 1 indicates the condition of the wavelength dispersion map of three channels, namely, the center wavelength (channel 5, in this case), the channel near the shortest wavelength side (channel 1, in this case) and the channel near the longest wavelength side (channel 9, in this case) of the signal beam wavelengths.

When a receiver is positioned at a transmission distance of 3000 km, a compensation amount of dispersion to be compensated in the receiver is different for each wavelength. This difference is due to the difference in residual dispersion at the receiver in each wavelength caused by the dispersion slopes.

Figure 2:
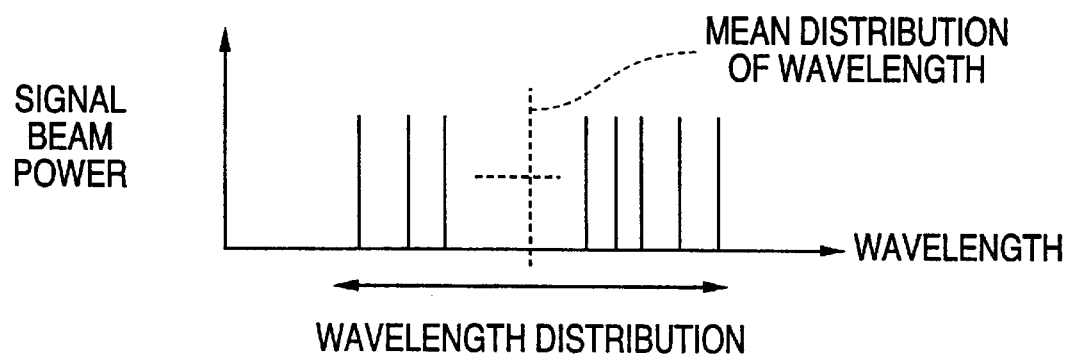
FIG. 2 is a diagram showing an average wavelength of a wavelength distribution.

FIG. 2 is a diagram showing that the center wavelength of distributed signal beam wavelengths is the average wavelength of the wavelength distribution of the signal beam. In the case of designing wavelength dispersion of the system as a whole, the optimum wavelength dispersion design of the center wavelength of the distributed signal beam wavelengths is very important to assure good balance of the transmission characteristics in all channels.

Figure 3:
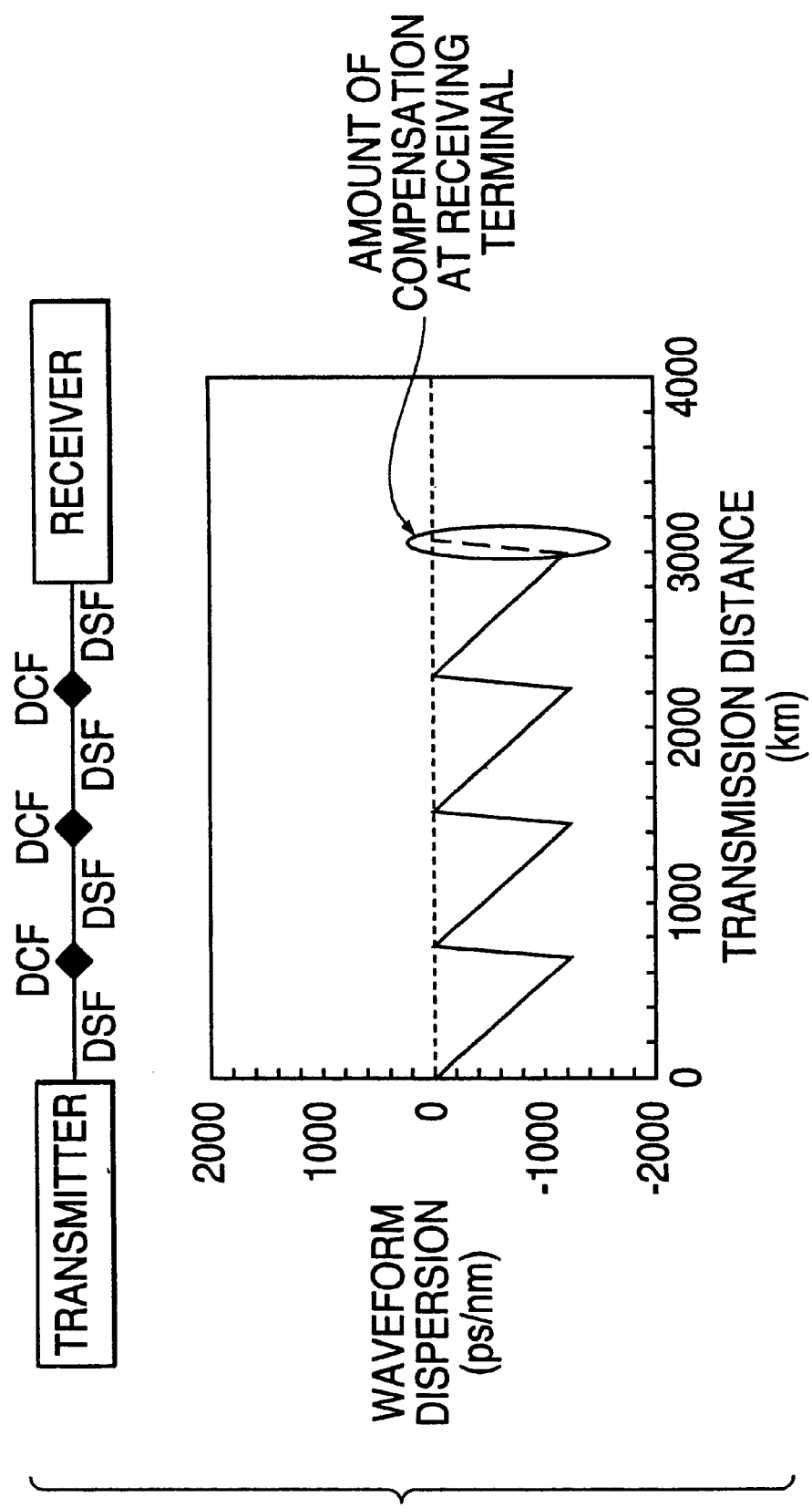
FIG. 3 is a diagram illustrating a wavelength dispersion map when a wavelength dispersion compensation is applied in an optical communication system.

FIG. 3 is a diagram showing the wavelength dispersion map in the center wavelength (channel 5) of the distributed signal beam wavelengths in above example. As shown in FIG. 3, as a result of optimum wavelength dispersion design, compensation of 100% is executed for the accumulated wavelength dispersion for the transmission path distance of 700 km for each insertion of DCF having a length of 70 km. Thus, the accumulated wavelength dispersion becomes zero for each insertion of the DCF. Thereafter, above structure is repeated along the transmission path.

In FIG. 3, after a transmission of 3000 km, the signal beam is dispersion-compensated (post-compensation) using a DCF in the receiver. More specifically, a dispersion amount indicated by a dotted line in FIG. 3 is compensated by a dispersion compensator, such as a DCF, provided in the receiver. The channels other than the center wavelength channel 5 are also dispersion-compensated by adjusting the length of DCF for each channel (signal beam wavelength) at the receiver because the residual dispersion accumulated in the transmission path by the influence of the dispersion slope is different depending on the characteristics in FIG. 1.

Figure 4:
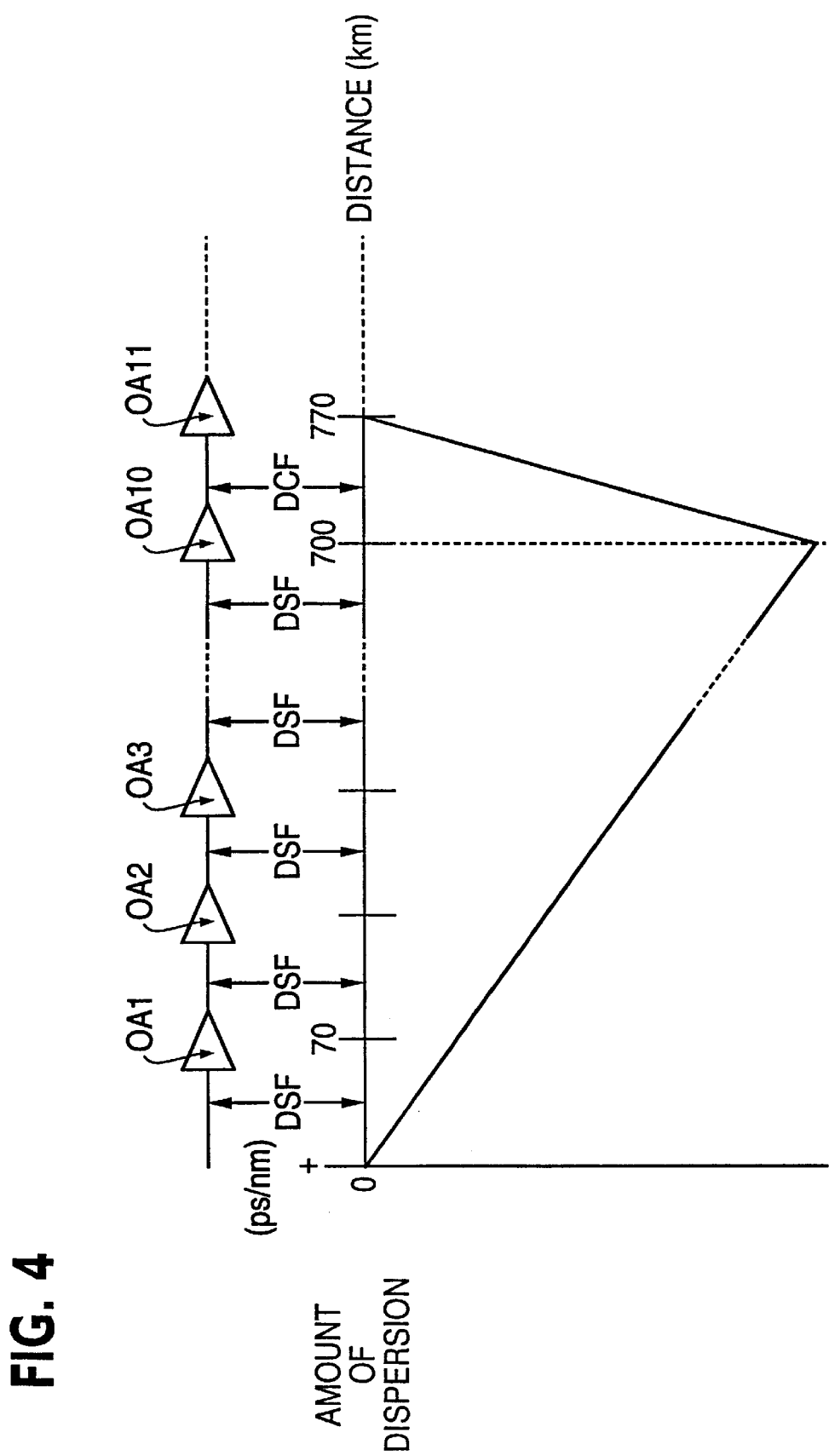
FIG. 4 is a diagram showing a section of an optical communication system for compensating for dispersion.

FIG. 4 is a diagram showing a section of an optical communication system providing the wavelength dispersion map of FIG. 3. Referring now to FIG. 4, a transmission distance of 700 km is realized by utilizing ten optical amplifiers/repeaters OA1 through OA10 spaced apart from each other in intervals of 70 km. DSF is used as the transmission fiber between the optical amplifiers/repeaters. The transmission path between optical amplifier/repeater OA10 and an optical amplifier/repeater OA11 is formed of a DCF. In this case, as illustrated in FIG. 4, dispersion compensation is conducted so that dispersion becomes zero at the 770 km point.

When a dispersion compensation technique as in FIGS. 3 and 4 is used, and when the transmission path becomes longer, the amount of dispersion compensating fiber at the receiver increases. As a result, the receiver will likely increase in size.

In addition, the dispersion amount to be compensated in the receiver must be adjusted to compensate for wavelength dispersion generated by manufacturing error of wavelength dispersion value in the DSF and DCF used in the transmission path.

Moreover, the residual dispersion is different in each wavelength due to the influence of the dispersion slope. Therefore, the dispersion compensation amount compensated in the receiver is different for each wavelength. If residual wavelength dispersion at the center wavelength is large, a large difference is generated between the channels having good and bad transmission characteristics. As a result, balance of the total system is lost and the size of the receiver becomes large.

For example, transmission for the distance of 10,000 km (ocean transversal distance) will be explained. Since the center wavelength of the distributed signal beam wavelengths is thought to be important, attention will be paid to this wavelength. Here, for example, it is assumed that wavelength dispersion in the DSF is set to −1.8 ps/nm/km, wavelength dispersion in the DCF is set to +18 ps/nm/km, the DCF is inserted in every other ten repeating points for every repeating distance of 70 km, and the accumulated wavelength dispersion of every DCF is compensated by 100%. As a calculation result using these typical values without any consideration of manufacturing error, a DCF of about 1260 ps/nm is required at the receiver. This is a relatively large DCF.

Moreover, manufacturing error generated when the fiber is actually manufactured must also be considered.

Figure 5:
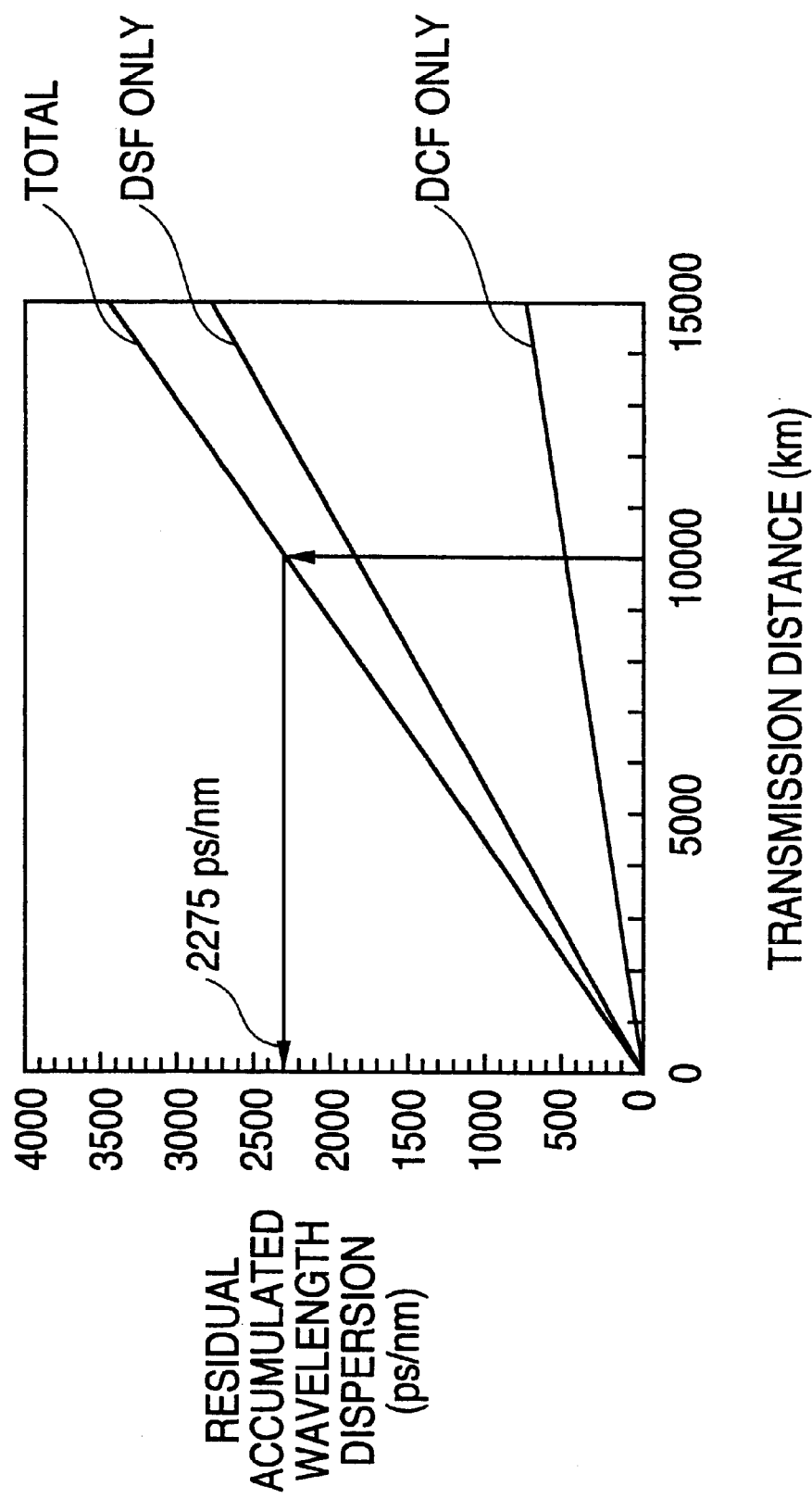
FIG. 5 is a diagram showing a residual wavelength dispersion amount due to manufacturing error in a transmission path.

FIG. 5 is a diagram showing the residual wavelength dispersion amount of a transmission path due to manufacturing error of a DSF and a DCF forming the transmission path. More specifically, FIG. 5 shows the residual wavelength dispersion amount when the manufacturing error of wavelength dispersion of a 1.5 µm zero dispersion DSF is ±0.2 ps/nm/km and the manufacturing error of wavelength dispersion of a DCF is ±0.5 ps/nm/km.

In accordance with the above, the rate of use of DSF and DCF in the transmission path is almost identical to an inverse number ratio of the wavelength dispersion and is about 10:1. In this case, the residual dispersion reaches ±2275 ps/nm, where manufacturing error of the DSF is ±1820 ps/nm and that of the DCF is ±455 ps/nm. In order to compensate for this residual dispersion, a DCF about ±120 km is necessary as the extra fiber. This distance corresponds to four sections.

As explained above, the DCF of 3535 ps/nm in maximum (1260+2275 ps/nm) is required to compensate for the residual wavelength dispersion at the receiver, by the technique described in FIGS. 1–4. In order to realize this dispersion compensation amount, a DCF of about 200 km is necessary. When loss of the fiber is assumed as 0.2 dB/km, the loss generated in this DCF is about 40 dB.

Here, two units of optical amplifiers having a gain of about 20 dB are required to compensate for this loss. Therefore, the structure and installation size of the receiver become large. Moreover, if residual dispersion is large, deterioration of transmission characteristic may be generated.

Therefore, as can be seen from above, when a signal is transmitted by WDM as shown in FIG. 1, dispersion compensation must be conducted for all channels in the receiver. Additional compensation for error of dispersion compensation in the receiver is also necessary to extend further the transmission distance. Accordingly, wavelength dispersion compensation at the receiver is necessary to prevent deterioration of the transmission characteristics.

Moreover, as can be seen from above, the technique disclosed in FIGS. 3–4 typically requires a large amount of dispersion compensation at the receiver. It would be desirable to reduce or eliminate this amount of dispersion compensation, to thereby reduce the size, cost and complexity of the receiver.

In contrast to the technique disclosed in FIGS. 3–4, and as will be described in more detail below, according to embodiments of the present invention, a DCF having a dispersion compensating amount larger than the accumulated wavelength dispersion amount is periodically inserted to approximate the residual dispersion to be compensated at the receiver to zero. As a result, in a single wave communication system, dispersion compensation in the receiver may be reduced or eliminated.

In addition, as will be discussed in more detail below, according to embodiments of the present invention, with WDM communication, the residual dispersion to be compensated by the center wavelength at the receiver is approximated to zero. The other wavelengths may be distributed around zero to reduce the dispersion compensation amount in the receiver. As a result, the size of the receiver can be reduced without deterioration of the transmission characteristics.

Moreover, as will be discussed in more detail below, according to embodiments of the present invention, since the dispersion compensating amount of the DCF inserted to the transmission path may be varied and fluctuation of residual dispersion amount by the manufacturing error can be reduced, the dispersion compensating amount in the receiver can be reduced.

Figure 6:
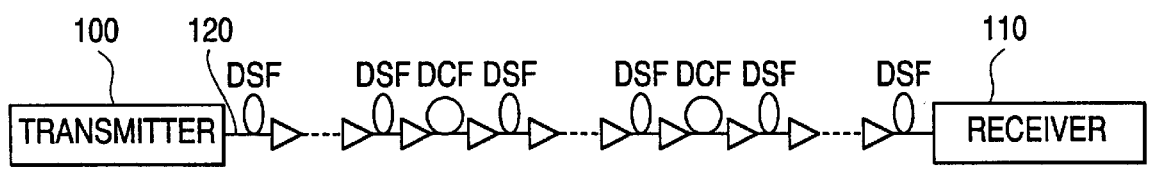
FIG. 6 is a diagram illustrating an optical communication system, according to an embodiment of the present invention.

FIG. 6 is a diagram illustrating an optical communication system, according to an embodiment of the present invention. In FIG. 6, DCFs are inserted into the transmission path to divide the transmission path into blocks. Residual dispersion is not set to zero in blocks for each insertion of the DCF. Instead, the final residual dispersion becomes substantially zero for the center wavelength in the distribution of a signal beam wavelength in a WDM communication system, or for the communication wavelength in a single wavelength communication system.

More specifically, referring now to FIG. 6, an n-wave signal beam is multiplexed in a transmitter 100 and is then demultiplexed in a receiver 110. The signal beam travels from transmitter 100 to receiver 110 through a transmission path 120. In transmission path 120, a dispersion compensating fiber DCF for dispersion compensation is introduced, for example, in every other several sections of DSF.

In a WDM communication system, for the center wavelength of distribution in the signal beam wavelength, the dispersion compensation amount of the DCF used for dispersion compensation is not set to zero at the output of the DCF. Instead, the use of DSFs and DCFs in transmission path 120 causes the final residual dispersion amount at receiver 110 to be approximately zero.

Particularly, when the dispersion compensating interval is equal, compensation amount of the DCF inserted into transmission path 120 exceeds the dispersion amount accumulated during transmission by DSFs up that point along transmission path 120. When the number of sections of DCF is defined as (m) and the number of blocks of DSF required for compensation (corresponding to several sections of DSF) as (m+1), compensation of about ((m+1)/m)×100% is required.

Figure 7:
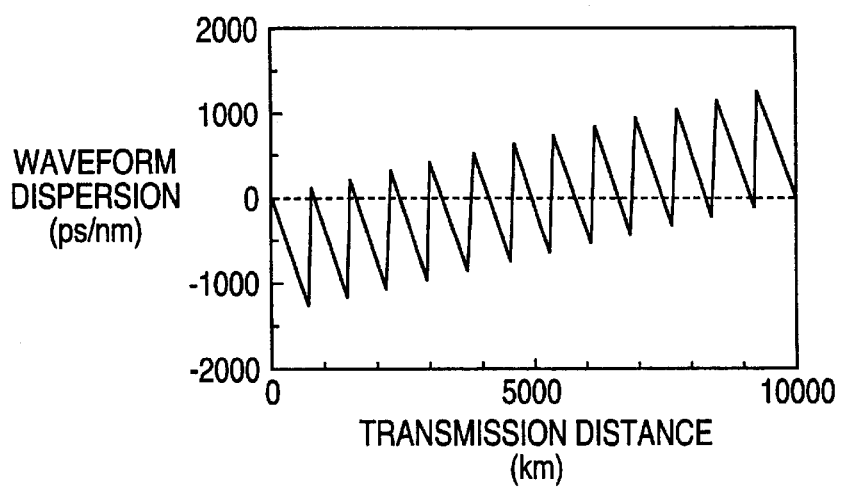
FIG. 7 is a diagram illustrating an example of a wavelength dispersion map for the optical communication system in FIG. 6, according to an embodiment of the present invention.

FIG. 7 is a diagram illustrating an example of a wavelength dispersion map for the optical communication system in FIG. 6, according to an embodiment of the present invention. In this example, wavelength dispersion in the DSF is set to −1.8 ps/nm/km, wavelength dispersion in the DCF is set to +18 ps/nm/km for the center wavelength of distribution in the signal beam wavelength, the transmission distance is 10,000 km, the transmission distance of one block of DSF (typically corresponding to several sections of DSF) is set to 700 km, and the transmission distance of one section of DCF is set to 76 km. One block of DSF plus one section of DCF can be considered to be one section of transmission path 120.

As shown in FIG. 7, in each section of transmission path 120 which includes a DCF, residual wavelength dispersion is not set to zero, but it finally becomes zero at the receiver. Namely, when the dispersion compensating interval is equal, if the number of sections of DCF is set to (m) and the number of blocks of DSF required for compensation is set to (m+1), compensation amount of the DCF may be set to about ((m+1)/m)×100%.

Figure 8:
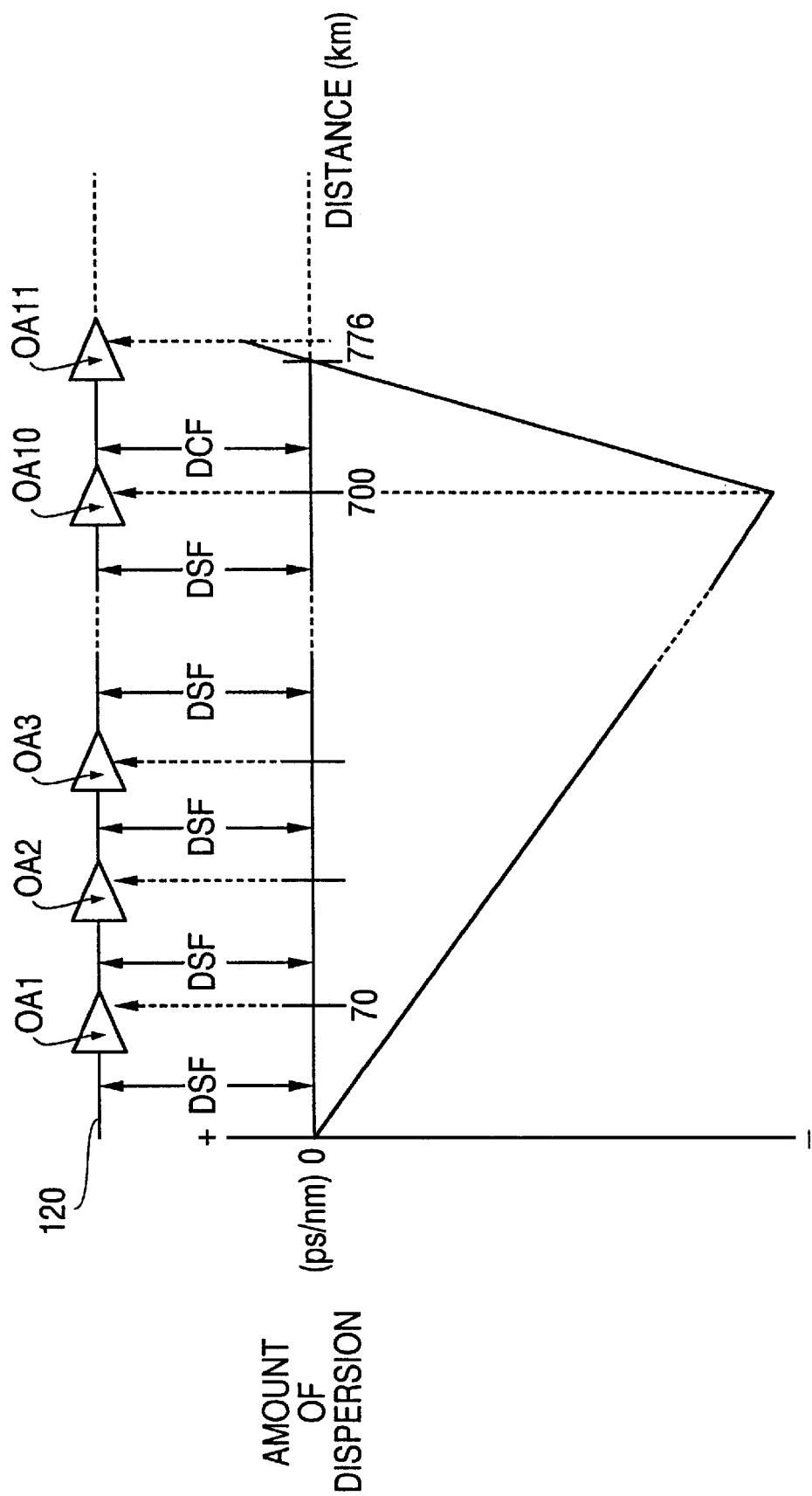
FIG. 8 is a diagram illustrating a section of a transmission path of an optical communication system having a wavelength dispersion map as in, for example, FIG. 7, according to an embodiment of the present invention.

FIG. 8 is a diagram illustrating a section of a transmission path having a wavelength dispersion map as in, for example, FIG. 7, according to an embodiment of the present invention. Here, it is assumed that the DCFs divide the transmission path into blocks, and the section of the transmission path illustrated in FIG. 8 includes one block of DSF and an associated section of DCF.

Referring now to FIG. 8, the dispersion value of the section of the transmission path exceeds 0. A positive dispersion value can be obtained by setting each transmission path DSF from the transmitter to optical amplifier/repeater OA1, and between optical amplifier/repeaters OA1 to OA10, to, for example, 70 km, respectively, and by inserting a DCF of, for example, 76 km, between optical amplifier/repeaters OA10 and OA11.

In FIGS. 7 and 8, the transmission path DSF has minus dispersion value, while the DCF has plus dispersion value.

Figure 9:
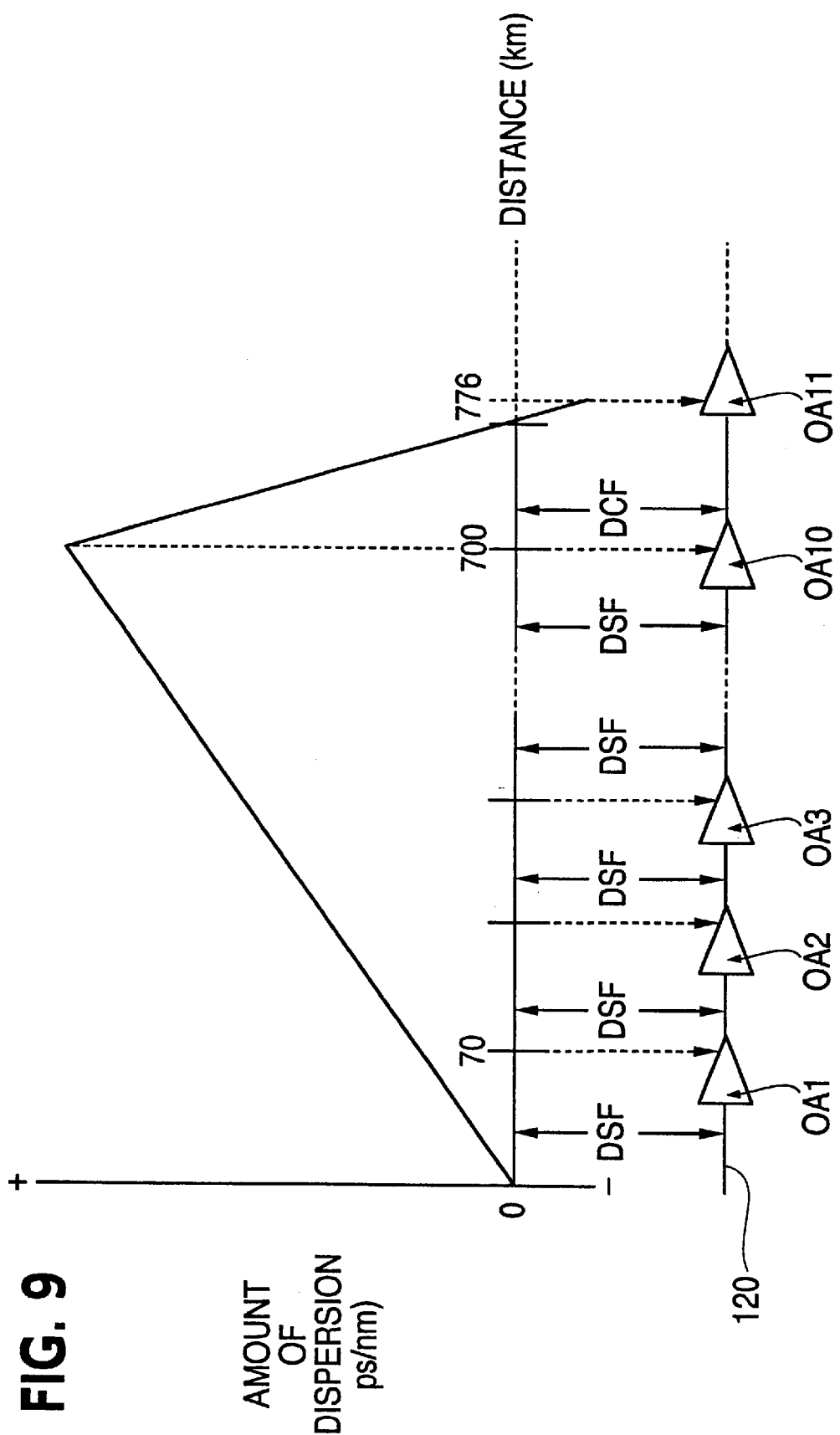
FIG. 9 is a diagram illustrating a section of a transmission path of an optical communication system, according to an additional embodiment of the present invention.
Figure 11A:
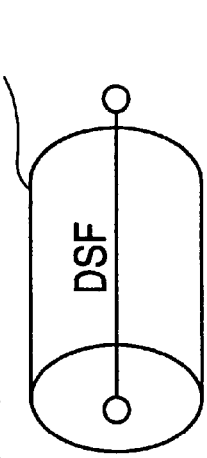
FIGS. 10(A), 10(B) and 10(C), and 11(A), 11(B) and 11(C) are diagrams illustrating the use of versatile cables for varying the dispersion compensating amount of an optical communication system, according to an embodiment of the present invention.
Figure 11B:
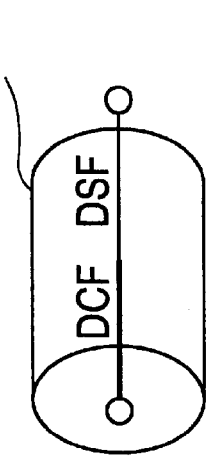
Figure 11C:
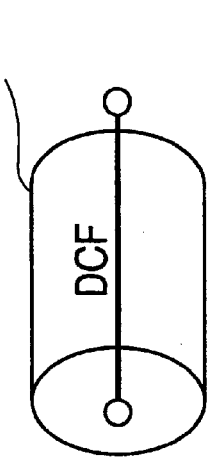
Figure 10A:
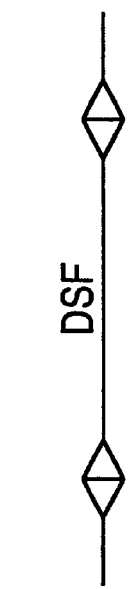
Figure 10B:
Figure 10C:

FIG. 9 is a diagram illustrating a section of a transmission path, where the signal is transmitted for 10,000 km, the transmission path DSF has plus dispersion value and the DCF has minus dispersion value, according to an embodiment of the present invention. As illustrated in FIG. 9, the dispersion value does not become zero in each section of the transmission path, but the residual dispersion amount is finally set to zero at the position where the receiver is installed.

In FIGS. 8 and 9, for a WDM optical communication system, the dispersion value is not set to zero in each section of the transmission path where the DCF is inserted for the center wavelength of distribution in the signal beam wavelength. Instead, the final residual dispersion is set to substantially zero. However, for WDM, when dispersion compensation is conducted for the particular wavelength for communication, it is also possible to conduct dispersion compensation so that the dispersion value does not become zero for the particular wavelength in the section of the transmission path having the particular wavelength. As an example of the particular wavelength, the wavelength of a channel to transmit high bit rate signal and the wavelength of channel required to have a low error rate can be considered. The transmission quality can be improved by arranging the wavelengths of these channels as the center wavelengths of total wavelengths.

FIGS. 8 and 9 illustrate all the DSFs as providing positive dispersion, or all the DSFs as providing negative dispersion.

However, the present invention is not intended to be limited to this. Instead, for example, the transmission path can include a mixture of DSFs providing positive and negative dispersion. Similarly, the DCFs are not limited to all providing positive dispersion, or all providing negative dispersion. Instead, the transmission path can have a mixture of DCFs providing positive or negative dispersion.

According to embodiments of the present invention, it may be possible to vary the dispersion compensating amount of DCFs inserted to the transmission path, adjust the dispersion amount and reduce fluctuation of the residual dispersion amount.

For example, the manufacturing error of wavelength dispersion of a DSF might vary by several percent. As a result, for example, if the manufacturing error of the DSF deviates to a negative accumulated value, the manufacturing error can be compensated by increasing the dispersion compensating value of a DCF inserted to the transmission path. If the manufacturing error of the DSF deviates to a positive accumulated value, the manufacturing error can be compensated by reducing dispersion amount of a DCF inserted to the transmission path.

To compensate for manufacturing error in the dispersion amount of the DSF, the dispersion compensating amount of a DCF inserted to the transmission path can be varied by, for example, (a) using versatile cables; (b) using cables having an increased number of fiber cores which can be selected; (c) changing the fiber length of the DCF; and (d) using DCFs having versatile wavelength dispersion values.

FIGS. 10(A), 10(B), 10(C) and 11(A), 11(B) and 11(C) are diagrams illustrating the use of versatile cables for varying the dispersion compensating amount, according to an embodiment of the present invention. A cable corresponding to the required dispersion compensating value can be selected from cables providing different amounts of dispersion compensation.

Figure 12:
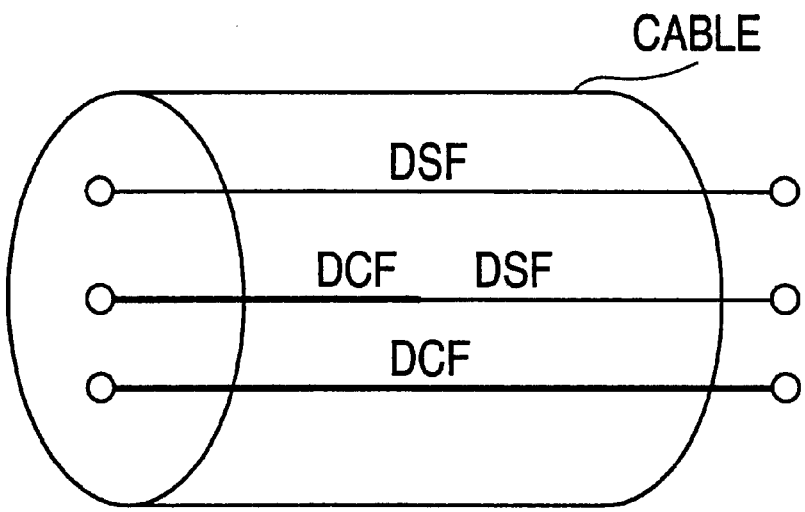
FIG. 12 is a diagram showing multi-core structure of a cable, according to an embodiment of the present invention.

FIG. 12 is a diagram illustrating a multi-core cable for varying the dispersion compensating amount, according to an embodiment of the present invention. As illustrated in FIG. 12, the multi-core cable includes versatile fibers in different dispersion compensating amounts within a single cable. The fiber of the optimum dispersion compensating amount is selected at the time of cable connection. The structure shown in FIG. 12 is economically preferable in comparison with a case where a single fiber is prepared for a single cable, and a case where a plurality of cables having different dispersion values are prepared, because cable is generally more expensive than fiber.

The dispersion compensation amount can also be varied by changing fiber length or cable length without changing the installation position of optical amplifiers/repeaters within a certain section.

Figure 13:
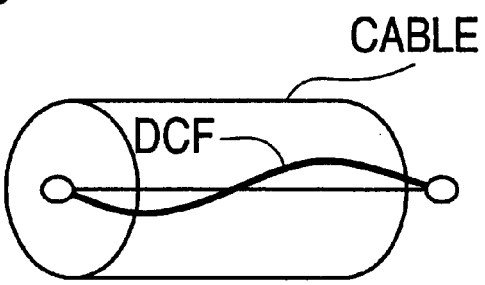
FIG. 13 is a diagram showing change of fiber length of a dispersion compensator, according to an embodiment of the present invention.
Figure 14:
FIG. 14 is a diagram showing change of cable length of a dispersion compensator, according to an embodiment of the present invention.

For example, FIGS. 13 and 14 are diagrams showing a DCF of a dispersion compensating section of a transmission path being physically formed in a longer length than the cable, so that the dispersion compensation amount can be varied, according to an embodiment of the present invention.

In FIG. 13, the DCF length can be set longer than the cable length by changing the radius of curvature when the DCF is wound to the tensile force line within the cable. The DCF length can be adjusted by changing a radius of curvature.

In FIG. 14, the cable laying section, namely optical amplifier/repeater interval, is set in the same distance as that of the other transmission section. The radius of curvature for meandering the cable when it is laid is selected to a value different from that of the DSF. Thereby, distance can substantially be extended or reduced to change the dispersion compensating amount.

Versatile wavelength dispersion compensating values of fibers can also be used to vary the wavelength dispersion compensating amount. In this case, versatile dispersion compensating fibers are prepared in different wavelength dispersion values in a certain section. Manufacture can be done easily by changing a ratio of the lengths of DSF and DCF forming the dispersion compensating section.

To realize a compact structure and installation at the receiver without deterioration of transmission characteristic, it may be effective to use a combination of the above-described techniques for varying the dispersion compensating amount based on the dispersion error for each dispersion compensating section of the transmission path.

In an example as explained above, the dispersion compensating amount can be adjusted and fluctuation of the residual wavelength dispersion due to the manufacturing error of fiber can be compensated by preparing versatile DCF in different dispersion amounts.

As an example, assume that wavelength dispersion in the DSF is set to −1.8 ps/nm/km, wavelength dispersion in the DCF is set to +18 ps/nm/km, and DCF is inserted in every other ten repeaters of the repeating distance of 70 km for the transmission distance of 10,000 km. Moreover, assume that the manufacturing error of wavelength dispersion of the DSF is set to ±0.2 ps/nm/km, and the manufacturing error of wavelength dispersion of the DCF is set to ±0.5 ps/nm/km. In this case, since fluctuation of ±2275 ps/nm is generated in the residual dispersion due to the manufacturing error, fluctuation of about ±120 km is generated as the dispersion compensating fiber length. To control such fluctuation, for example, as described above, cables having different rates of dispersion compensating fiber can be used.

First, three kinds of fiber in the rate of dispersion compensating fiber of 0%, 50% and 100% are assumed, considering the merits in the manufacturing process and economical aspect. If residual wavelength dispersion amount of the system as a whole is deviated to negative, the rate of the DCF is changed to 100% from 50% and if it is deviated to positive, the rate of the DCF is changed to 0% from 50%, by arranging the section where the rate of DCF is 50% when the manufacturing error is not included.

Residual wavelength dispersion can be adjusted in the wavelength dispersion value step of a half section of the repeating section. Namely, when the repeating section is 70 km, the residual wavelength dispersion can be adjusted in the step of about 700 ps/nm.

Moreover, since fluctuation of about ±120 km exists as the fiber length, about three sections (3×35 km) are required in this case to compensate for such fluctuation.

An example where the section having the rate of the dispersion compensating fiber of 50% is introduced up to three sections will be explained below.

Figure 15:
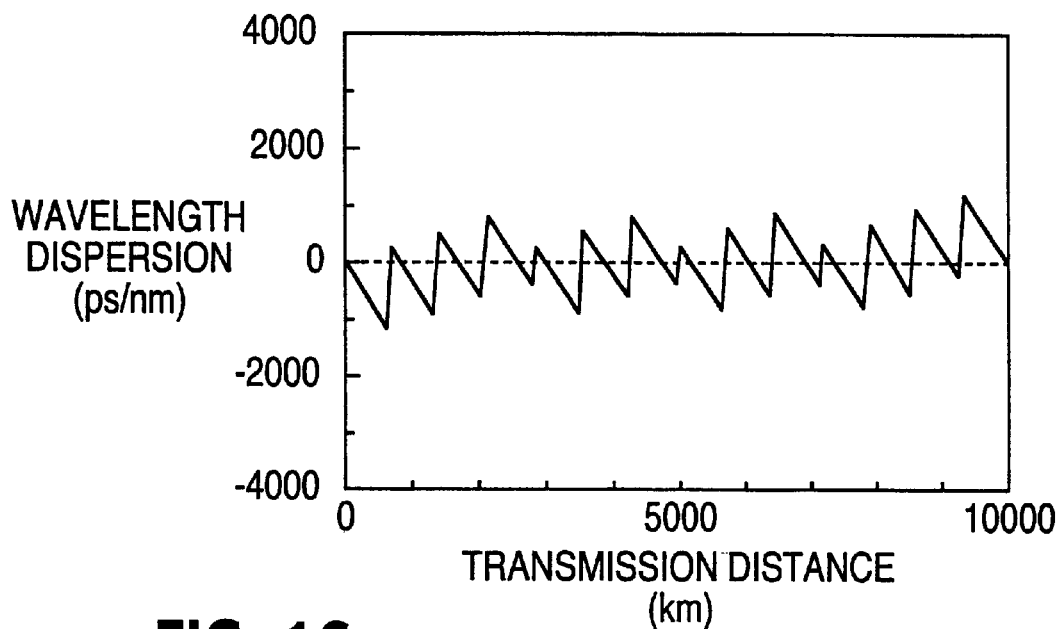
FIGS. 15–24 are diagrams showing wavelength dispersion maps, according to embodiments of the present invention.

FIG. 15 is a diagram showing the wavelength dispersion map not including manufacturing error, according to an embodiment of the present invention. Here, it is assumed that the optimum wavelength dispersion design is conducted when manufacturing error is not included. In FIG. 15, the repeating section length is 70 km.

Figure 16:
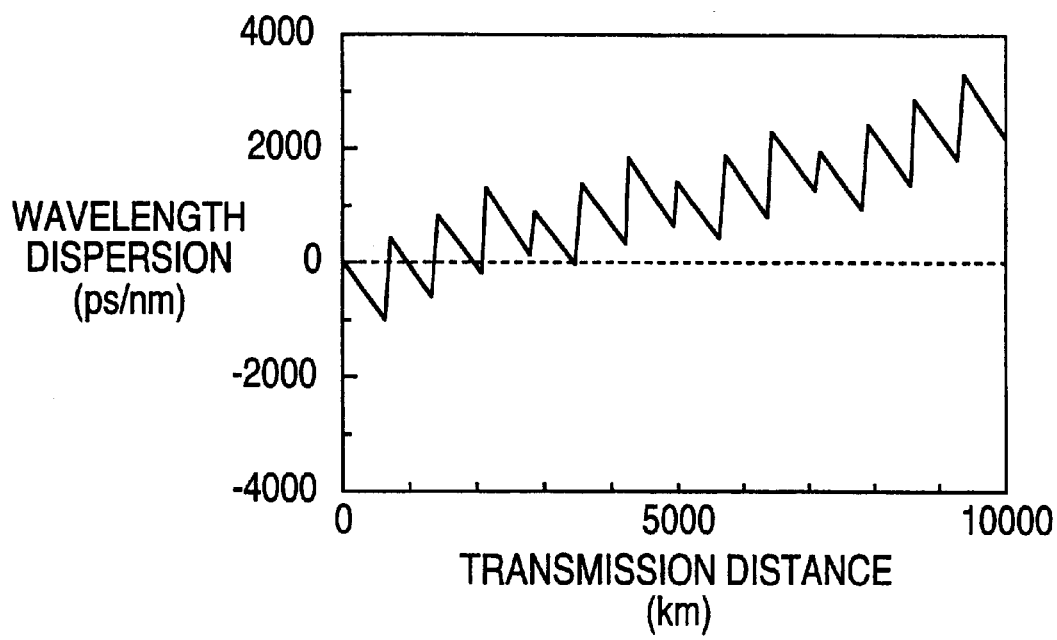

FIG. 16 is a diagram showing the wavelength dispersion map including the manufacturing error of wavelength dispersion of DSF of +0.2 ps/mn/km and manufacturing error of wavelength dispersion of dispersion compensating fiber of +0.5 ps/nm/km, according to an embodiment of the present invention. The repeating section length is 70 km.

Figure 17:
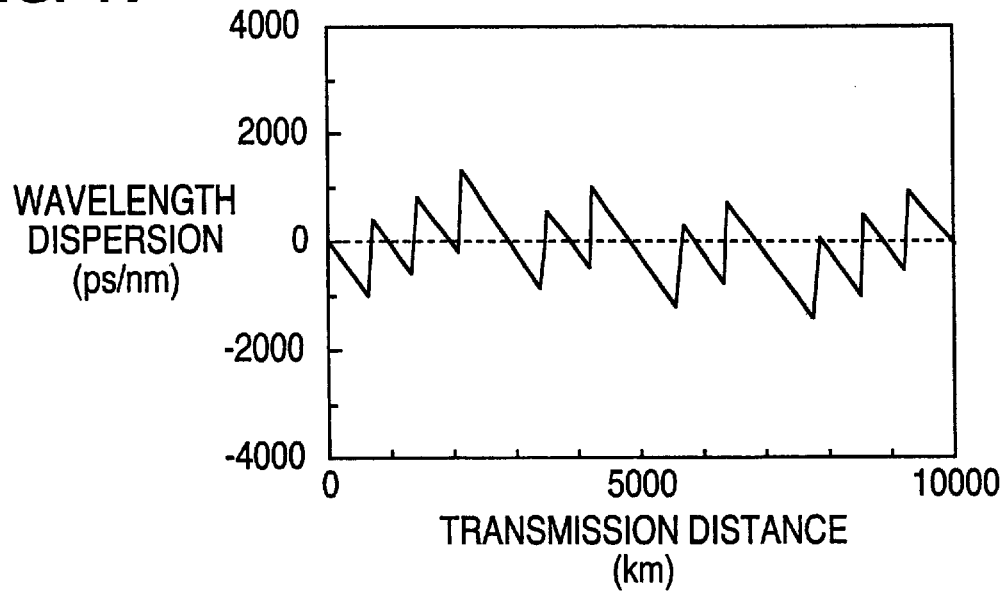

On the other hand, FIG. 17 is a diagram showing the wavelength dispersion map when the wavelength dispersion of the system as a whole is adjusted, because dispersion is deviated to positive, by changing the rate of dispersion compensating fiber to 0% from 50%, according to an embodiment of the present invention. In FIG. 17, the wavelength dispersion map includes a manufacturing error of wavelength dispersion of DSF of +0.2 ps/nm/km and a manufacturing error of wavelength dispersion of dispersion compensating fiber of +0.5 ps/nm/km. In FIG. 17, the repeating section length is 70 km.

Figure 18:
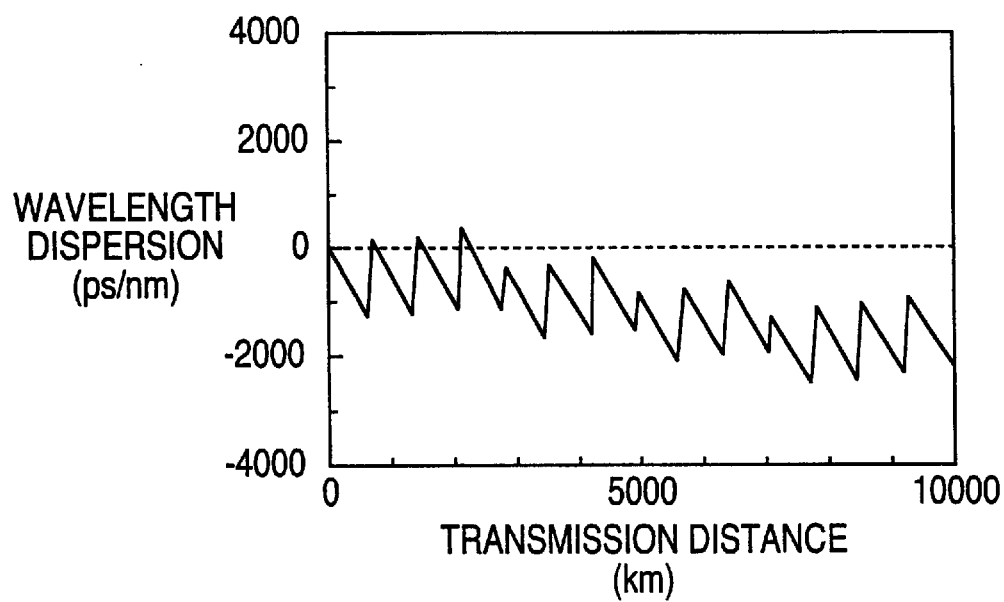

Moreover, FIG. 18 is a diagram showing the wavelength dispersion map including a manufacturing error of wavelength dispersion of DSF of −0.2 ps/nm/km and a manufacturing error of wavelength dispersion of dispersion compensating fiber of −0.5 ps/nm/km, according to an embodiment of the present invention. In FIG. 18, the repeating section length is 70 km.

Figure 19:
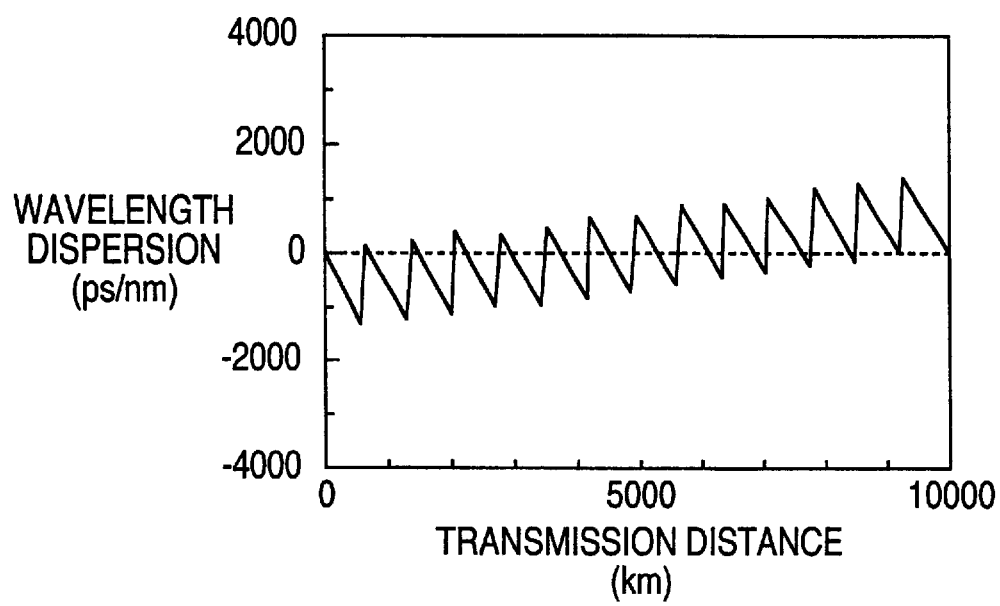

Meanwhile, FIG. 19 is a diagram showing the wavelength dispersion map when the wavelength dispersion of the system as a whole is adjusted, because dispersion is deviated to negative, by changing the rate of dispersion compensating fiber to 100% from 50%, according to an embodiment of the present invention. In FIG. 19, the wavelength dispersion map includes a manufacturing error of wavelength dispersion of DSF of −0.2 ps/nm/km and a manufacturing error of wavelength dispersion of dispersion compensating fiber of −0.5 ps/nm/km. The repeating section length is 70 km.

Therefore, as explained above, fluctuation by the manufacturing error can be controlled.

Next, the case where the repeating interval is set to 50 km will be explained. Since the fluctuation of about ±120 km exists within the fiber length, about four repeating sections (4×25 km) will be required for compensating such fluctuation.

The case where the section having the rate of DCF of 50% is used, up to four sections will be explained. Since the repeating section is 50 km, residual wavelength dispersion amount of the system can be adjusted in the step of about 500 ps/nm.

Figure 20:
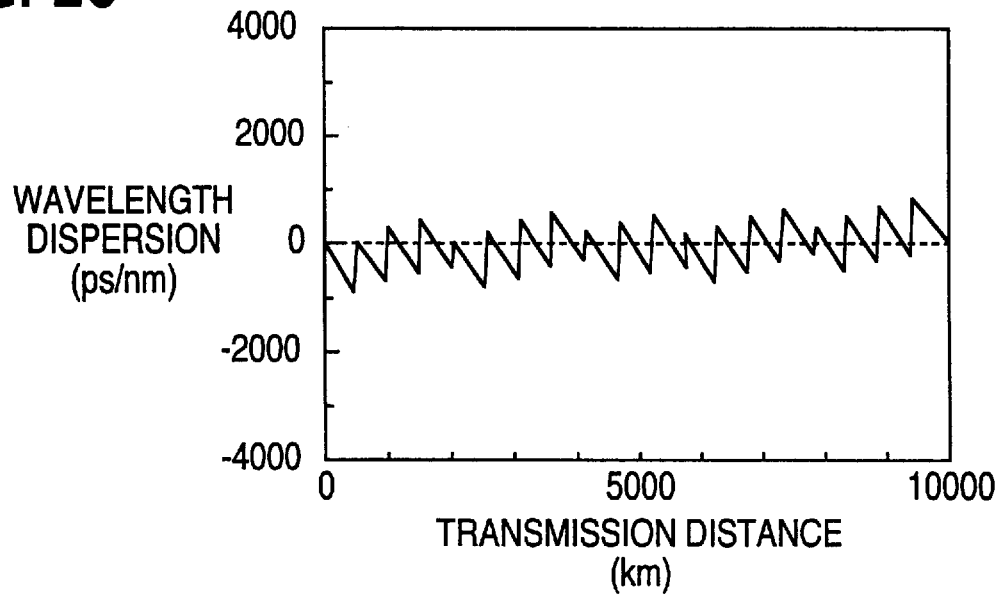

FIG. 20 is a diagram showing the wavelength dispersion map not including manufacturing error, according to an embodiment of the present invention. Here it is assumed that optimum wavelength dispersion design is conducted when the manufacturing error is not included. The repeating section length is 50 km.

Figure 23:
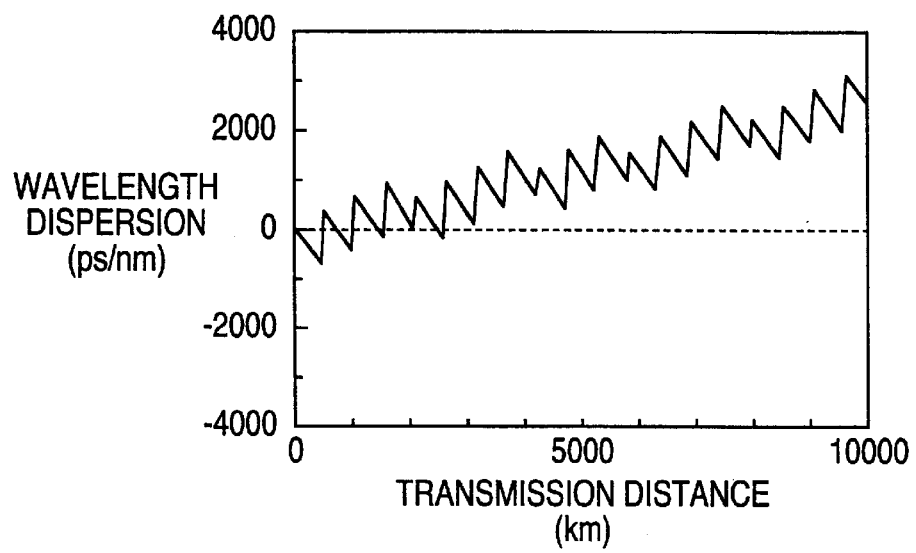

FIG. 23 is a diagram showing the wavelength dispersion map including a manufacturing error of wavelength dispersion of DSF of +0.2 ps/nm/km and a manufacturing error of wavelength dispersion of dispersion compensating fiber of +0.5 ps/nm/km, according to an embodiment of the present invention. The repeating section length is 50 km.

Figure 24:
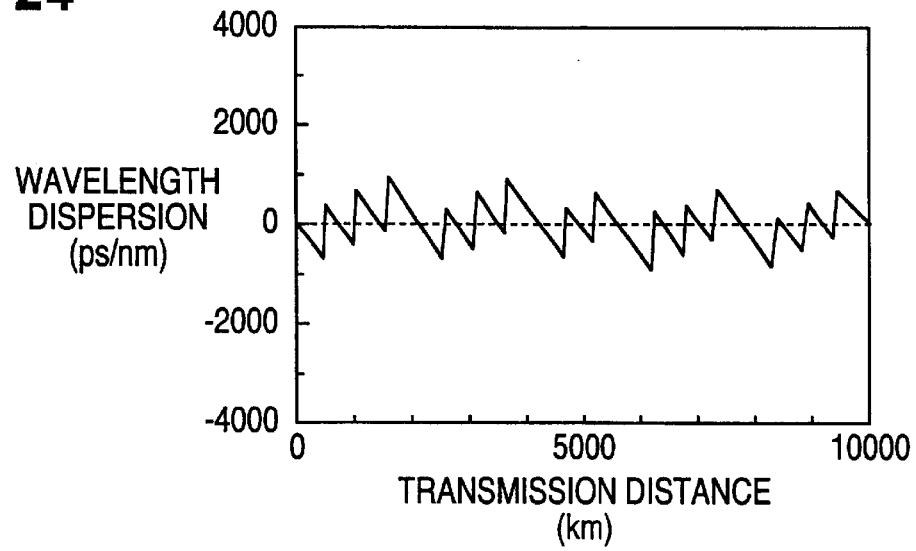

On the other hand, FIG. 24 is a diagram showing the wavelength dispersion map when wavelength dispersion of system as a whole is adjusted by changing the rate of dispersion compensating fiber to 0% from 50% because dispersion is deviated to positive, according to an embodiment of the present invention. In FIG. 24, the wavelength dispersion map includes a manufacturing error of wavelength dispersion of DSF of +0.2 ps/nm/km and a manufacturing error of wavelength dispersion of dispersion compensating fiber of +0.5 ps/nm/km. The repeating section length is 50 km.

Figure 21:
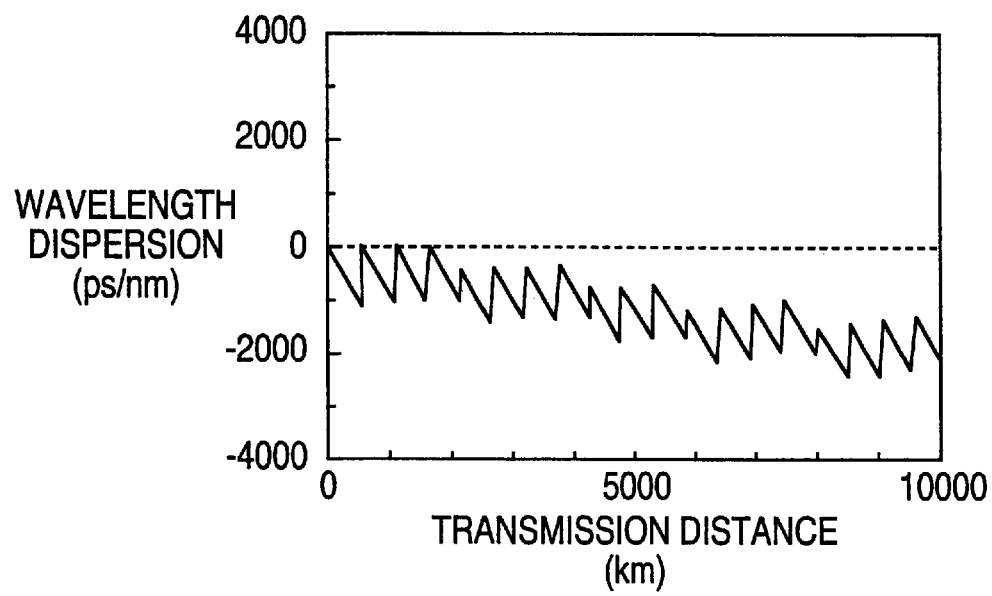

Moreover, FIG. 21 is a diagram showing the wavelength dispersion map including a manufacturing error of wavelength dispersion of DSF of −0.2 ps/nm/km and a manufacturing error of wavelength dispersion of dispersion compensating fiber of −0.5 ps/nm/km, according to an embodiment of the present invention. The repeating section length is 50 km.

Figure 22:
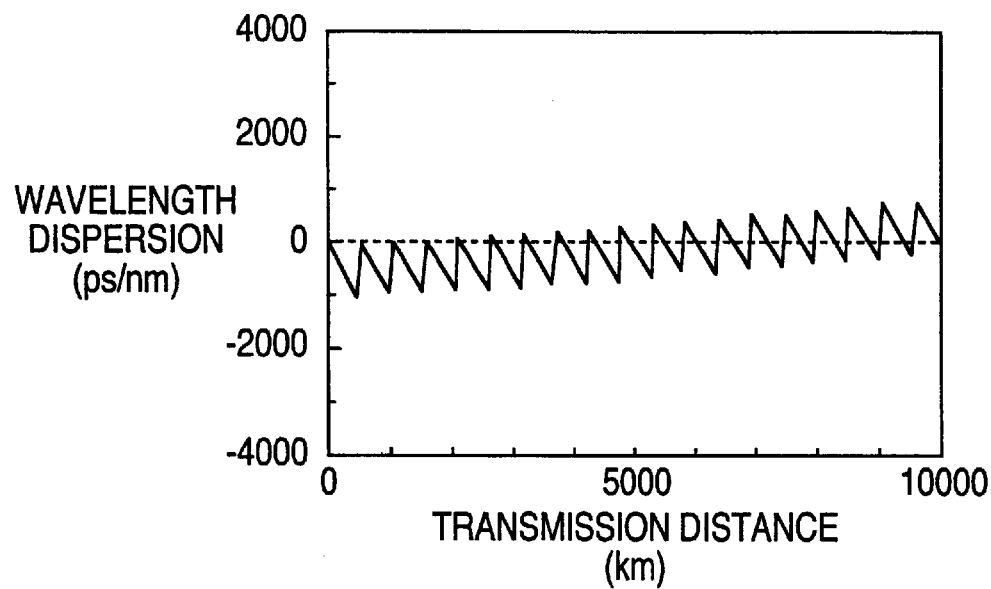

FIG. 22 is a diagram showing the wavelength dispersion map when the wavelength dispersion of system as a whole is adjusted by changing the rate of dispersion compensating fiber to 100% from 0% because dispersion is deviated to positive, according to an embodiment of the present invention. In FIG. 22, the wavelength dispersion map includes a manufacturing error of wavelength dispersion of DSF of −0.2 ps/nm/km and a manufacturing error of wavelength dispersion of dispersion compensating fiber of −0.5 ps/nm/km. The repeating section length is 50 km.

As explained above, fluctuation by the manufacturing error can be controlled. Moreover, when it is required to set the adjusting step of residual wavelength dispersion smaller value, it can be realized by further increasing kinds of the rates of the dispersion compensating fiber.

Figure 25:
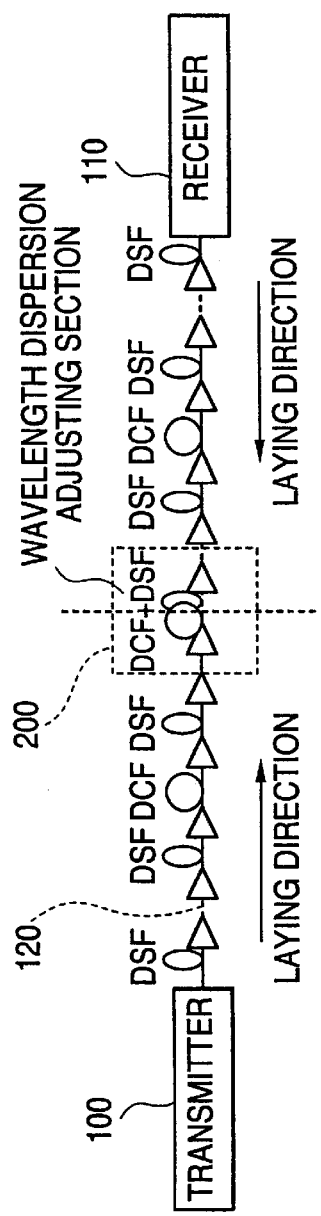
FIG. 25 is a diagram showing an optical communication system, according to an embodiment of the present invention.

FIG. 25 is a diagram showing an optical communication system having a wavelength dispersion adjusting section for compensating the manufacturing error of wavelength dispersion of the system as a whole, according to an embodiment of the present invention. Referring now to FIG. 25, a wavelength dispersion adjusting section 200 is provided along transmission path 120.

In wavelength dispersion adjusting section 200, various of the above-described techniques can be used to adjust wavelength dispersion. For example, in wavelength dispersion adjusting section 200, an optimum fiber can be selected at both terminal stations. Therefore, the final wavelength dispersion can be equalized, for example, by selecting an adequate fiber from those having versatile dispersion values prepared from the fiber and cable formed as described above.

In FIG. 25, characteristics of the fibers laid in the course of laying the fibers respectively from the transmitter and receiver are investigated. Wavelength dispersion error of the system as a whole is adjusted using any one or combination of the techniques disclosed herein considering the section for connecting the cable laid from the transmitter and the cable laid from the receiver as wavelength dispersion adjusting section 200. The dispersion amount is adjusted so that the transmission characteristics do not deteriorate, by adjusting the dispersion amount to make substantially zero the wavelength dispersion at the receiver position.

According to embodiments of the present invention, when a signal is transmitted in WDM mode, it is no longer required to conduct dispersion compensation for an average wavelength of a wavelength distribution in the receiver and accumulated dispersion for all channels can be reduced. Moreover, since adjustment is conducted using the center wavelength in WDM mode, fluctuation of dispersion of the other wavelengths becomes almost zero, and total amount of dispersion in the dispersion compensator required in the receiver can be reduced. Accordingly, an optical amplifier for compensating loss by the dispersion compensator can be eliminated in the receiver.

In addition, conventionally, it was required to compensate for the error of dispersion compensation in the receiver to expand the transmission distance. However, according to embodiments of the present invention, the dispersion compensating amount in the receiver can be reduced or eliminated because an error is also compensated by the dispersion compensator provided in the transmission path.

According to the above embodiments of the present invention, an optical amplifier provided for compensating loss by the dispersion compensator can be eliminated. Moreover, in various embodiments of the present invention, a dispersion compensator in a receiver can be eliminated or reduced in size.

According to the above embodiments of the present invention, an optical communication system includes a transmission path through which a light is transmitted to a specific point, such as to a receiver. The transmission path includes a plurality of sections so that the light travels through the sections to the specific point. For example, in FIGS. 8 and 9, each block of optical amplifiers optically connected together, along with the DCF, forms a respective section of the transmission path. As illustrated in FIGS. 8 and 9, each section overcompensates for dispersion produced in the respective section for the light so that an amount of dispersion for the light at the specific point is controlled, reduced, or made to be substantially zero.

Moreover, according to the above embodiments of the present invention, an optical communication system includes a transmission path having a plurality of sections through which light travels to a specific point. The plurality of sections together overcompensate for dispersion produced in the sections for the light. The total amount of overcompensation in the sections taken together is substantially equal to a residual dispersion in the light at the specific point which would occur if the dispersion for the light in each section was approximately zero. Therefore, generally, a specific amount of dispersion compensation is required to compensate for dispersion occurring in portions of the transmission path other than the section providing dispersion compensation. This specific amount of dispersion compensation is essentially "distributed" to the sections. For example, in FIGS. 8 and 9, dispersion compensation is required to compensate for dispersion occurring between optical amplifier/repeaters OA10 and OA11. According to embodiments of the present invention, this amount of dispersion is essentially distributed to the various sections, so that the total amount of overcompensation provided by the sections substantially equals that required to compensate for dispersion occurring between optical amplifiers OA10 and OA11.

According to embodiments of the present invention, m dispersion compensators are positioned along the transmission path to divide the transmission path into (m+1) blocks. Each dispersion compensator overcompensates for dispersion produced in the preceding block so that the amount of dispersion for the light at the specific point is substantially zero. For example, see FIGS. 8 and 9.

Moreover, according to embodiments of the present invention, an optical communication system includes a transmission path through which a light is transmitted to a specific point. A dispersion compensator is positioned along the transmission path before the specific point. The dispersion compensator overcompensates for dispersion provided by the transmission path to the light up to a point along the transmission path before the specific point, so that the amount of dispersion for the light at the specific point is controlled, reduced, or is substantially zero. According to the above embodiments of the present invention, various blocks or sections of a transmission path include optical amplifiers/repeaters. For example, FIGS. 8 and 9 illustrate one block as including ten optical amplifiers/repeaters. However, a block or section is not intended to be limited to having any specific number of optical amplifiers/repeaters. Instead, the number of optical amplifiers/repeaters used in a specific configuration will depend, for example, on the design specifications of the system.

According to the above embodiments of the present invention, a DCF is typically positioned in a section of a transmission line after the last optical amplifier/repeater in the section. For example, in FIGS. 8 and 9, a DCF is positioned after the last optical amplifier/repeater OA 10. However, the present invention is not intended to be limited to this positioning of the DCF. Instead, a DCF can be positioned anywhere along the section. Moreover, a DCF is not intended to be limited to being a single DCF positioned in the section. Instead, many different DCFs positioned at different locations in a section of the transmission path can together be considered as being a DCF or dispersion compensator. Thus, for example, in FIGS. 8 and 9, each section can have, for example, two DCFs positioned somewhere along the section, where the two DCFs, taken together, provide the required amount of dispersion compensation.

Figure 26:
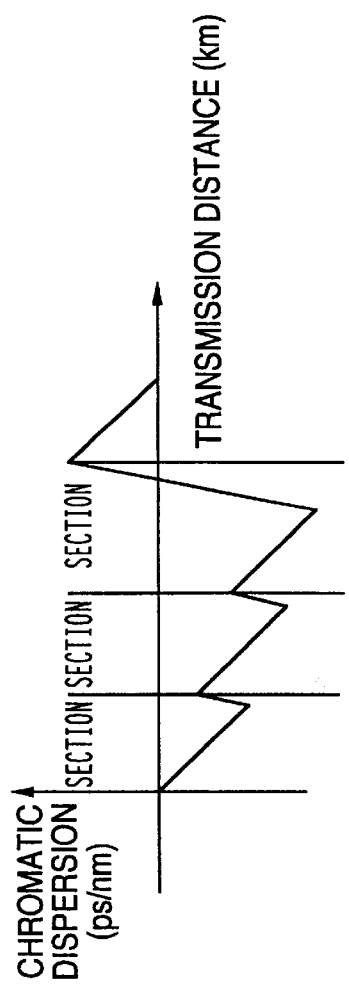
FIG. 26 is a diagram illustrating an example of a dispersion map for an optical communication system, according to an embodiment of the present invention.

The present invention will also be operable as far as the total dispersion at a specific point is controlled to become substantially zero. This is shown in FIG. 26 as another embodiment of the present invention. In FIG. 26, the dispersion in at least one section is overcompensated, and the dispersions in other sections are undercompensated.

According to various embodiments of the present invention, sections of a transmission path overcompensate for dispersion produced in the respective sections so that an amount of dispersion for light travelling through the sections to a the specific point (such as the location of a receiver) is substantially zero. However, the present invention is not intended to be limited to controlling the dispersion at the specific point to be "substantially zero". Instead, the sections can be seen as simply controlling or reducing the amount of dispersion at the specific point. Thus, the dispersion is not limited to being substantially zero at the specific point.

According to the above embodiments of the present invention, a dispersion compensator is used to provide dispersion overcompensation. The dispersion compensator can be, for example, a variable dispersion compensator which is controllable to vary the amount of overcompensation. For example, the various configurations in FIGS. 10–14 can be considered to be variable dispersion compensators, since the amount of dispersion provided by these configuration can be changed. Typically, with these configurations, the amount of dispersion provided by the dispersion compensator is set during installation. However, a variable dispersion compensator can be used in which the amount of dispersion compensation is changeable after installation and/or after operation of the system. Moreover, the present invention is not intended to be limited to dispersion compensators formed of dispersion compensating fibers, and other types of dispersion compensators can be used.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical communication system comprising:
   a transmission path including a plurality of adjacent sections arranged along the transmission path, a light traveling through the plurality of sections to a specific point downstream of the plurality of sections and along the transmission path, an additional portion of the transmission path extending from a farthest downstream section of the plurality of sections to the specific point, a residual dispersion being incurred by the light in said additional portion, each section including
   a non-dispersion compensating fiber through which the light travels, and a dispersion compensator compensating for dispersion wherein
   the dispersion compensators, taken together, overcompensate for dispersion produced in the sections, taken together, and
   a total amount of overcompensation in the sections, taken together, provided by the dispersion compensators, taken together, being substantially equal to said residual dispersion.

2. An optical communication system as in claim 1, further comprising:
   a transmitter; and
   a receiver at the specific point, the transmitter transmitting the light to the receiver through the transmission path.

3. An optical communication system as in claim 1, wherein the light includes a plurality of different wavelengths including a center wavelength, and the dispersion compensators, taken together, overcompensate for the dispersion produced in the sections for light at the center wavelength so that the amount of dispersion for the light at the center wavelength at the specific point is substantially zero.

4. An optical communication system as in claim 1, wherein each section comprises:
   a plurality of optical amplifiers arranged along the transmission path; and
   a respective dispersion compensator of the dispersion compensators overcompensating for dispersion produced in the section.

5. An optical communication system as in claim 1, wherein each section comprises:
   a plurality of optical amplifiers arranged along the transmission path in equal intervals from a first optical amplifier to a last optical amplifier; and
   a respective dispersion compensator of the dispersion compensators overcompensating for dispersion produced in the section.

6. An optical communication system as in claim 1, wherein the dispersion compensators are variable dispersion compensators.

7. An optical communication system as in claim 1, wherein
   when the transmission path provides a positive dispersion to the light, the dispersion compensators, taken together, overcompensate for dispersion by adding a negative dispersion to the light, and
   when the transmission path provides a negative dispersion to the light, the dispersion compensators, taken together, overcompensate for dispersion by adding a positive dispersion to the light.

8. An optical communication system comprising:
   a transmission path including a plurality of adjacent sections positioned along the transmission path, a light traveling through the plurality of sections to a specific point downstream of the plurality of sections and along the transmission path, an additional portion of the transmission path extending from a farthest downstream section of the plurality of sections to the specific point, a residual dispersion being incurred by the light in said additional portion, each section including
   a non-dispersion compensating fiber through which the light travels when traveling through the respective section, and a dispersion compensator, wherein
the dispersion compensator of at least one section overcompensates for dispersion produced in the respective section for the light so that the dispersion compensators of all the sections, taken together, overcompensate for dispersion produced in the sections, taken together, and
a total amount of overcompensation in the sections, taken together, provided by the dispersion compensators, taken together, being substantially equal to said residual dispersion.

9. An optical communication system transmitting a wavelength division multiplexed (WDM) light including a plurality of different wavelengths multiplexed together, a respective wavelength of the plurality of different wavelengths being a center wavelength, the system comprising:
a transmission path including a plurality of adjacent sections arranged along the transmission path, the WDM light traveling through the plurality of sections to a specific point downstream of the plurality of sections and along the transmission path, an additional portion of the transmission path extending from a farthest downstream section of the plurality of sections to the specific point, the WDM light incurring a residual dispersion in said additional portion, the plurality of sections together including
a plurality of non-dispersion compensating fibers through which the WDM light travels, and
a plurality of dispersion compensators overcompensating for dispersion produced in the sections for the WDM light, a total amount of overcompensation in the sections taken together being substantially equal to said residual dispersion for the center wavelength.

10. An optical communication system as in claim 9, further comprising:

a transmitter; and
a receiver at the specific point, the transmitter transmitting the WDM light to the receiver through the transmission path.

11. An optical communication system as in claim 9, wherein each section comprises:
a plurality of optical amplifiers arranged along the transmission path; and
a respective dispersion compensator of the plurality of dispersion compensators overcompensating for dispersion produced in the section.

12. An optical communication system as in claim 9, wherein each section comprises:
a plurality of optical amplifiers arranged along the transmission path in equal intervals from a first optical amplifier to a last optical amplifier; and
a respective dispersion compensator of the plurality of dispersion compensators overcompensating for dispersion produced in the section.

13. An optical communication system as in claim 11, wherein the dispersion compensators are variable dispersion compensators.

14. An optical communication system as in claim 9, wherein
when the transmission path provides a positive dispersion to the WDM light, the plurality of dispersion compensators together overcompensate for dispersion by adding a negative dispersion to the WDM light, and
when the transmission path provides a negative dispersion to the WDM light, the plurality of dispersion compensators together overcompensate for dispersion by adding a positive dispersion to the WDM light.

* * * * *